(12) United States Patent
Dou

(10) Patent No.: US 6,793,195 B2
(45) Date of Patent: Sep. 21, 2004

(54) FAUCET FOR WATERBOWL

(75) Inventor: Hai Dou, GuangDong Province (CN)

(73) Assignee: GD Midea Holding Co., Ltd., GuangDong Province (CN)

( * ) Notice: Subject to any disclaimer, the term of this patent is extended or adjusted under 35 U.S.C. 154(b) by 54 days.

(21) Appl. No.: 10/342,680

(22) Filed: Jan. 15, 2003

(65) Prior Publication Data

US 2003/0164463 A1 Sep. 4, 2003

(30) Foreign Application Priority Data

Feb. 8, 2002 (CN) .................................... 02 2 25716 U

(51) Int. Cl.[7] .............................................. F16K 35/00

(52) U.S. Cl. ...................... 251/96; 251/110; 251/237; 251/251

(58) Field of Search ............................... 251/95, 96, 97, 251/98, 99, 101, 102, 110, 237, 251, 296; 137/630.19

(56) References Cited

U.S. PATENT DOCUMENTS

| 3,153,498 A | * | 10/1964 | Bakker | 222/506 |
| 3,986,700 A | * | 10/1976 | Carpentier | 251/296 |
| 4,460,153 A | * | 7/1984 | Williams | 251/99 |

* cited by examiner

*Primary Examiner*—Edward K. Look
*Assistant Examiner*—John K. Fristoe, Jr.
(74) *Attorney, Agent, or Firm*—RatnerPrestia

(57) ABSTRACT

A faucet for a waterbowl includes a control knob, a lifting seat, a valve cover, a valve body and a spindle assembly which controls the water flow on-off. The spindle assembly is provided within the valve body, with a spindle of the spindle assembly extending through the upper end of the valve body and hinged to the lifting base. The valve cover is mounted firmly the top of the valve body. Between the control knob and the lifting seat is provided a rotatable locator connected to the lifting seat and rotatable round the lifting seat. The control knob is attached to the upper part of the rotatable locator by a hollow slidable connecting housing. A sliding rod provided in the slidable connecting housing is inserted into a through hole on the rotatable locator, with a return spring provided on the sliding rod. The faucet may avoid mishandling and scalding.

10 Claims, 5 Drawing Sheets

FAUCET FOR WATERBOWL

FIELD OF THE INVENTION

The present invention relates to a faucet for a waterbowl or a water faucet, and more particularly to such a faucet which is capable of preventing the water from flowing out of the waterbowl as a result of the user's mishandling.

DESCRIPTION OF THE BACKGROUND ART

The conventional faucet for a waterbowl generally includes a spindle with a return spring and a control knob to which the spindle is hinged. The user operates the control knob to cause it pitching motion, thereby moving the spindle upwardly and downwardly to open and close the faucet. Although it is easy and convenient to operate and use such faucet, the user may touch unconsciously the control knob to open the faucet, thereby causing the hot water to flow out of the waterbowl and scalding the user or the other persons around the user. Especially when a child is playing and presses the control knob without intention, the consequence would be more serious and inconceivable.

SUMMARY OF THE INVENTION

An object of the invention is to overcome the problems of the conventional faucet for a waterbowl and provide an improved faucet which may be opened only by pressing the control knob downwardly and then turning the control knob downwardly. The faucet according to the present invention may avoid the user's mishandling, thereby preventing the user from being scalded by the hot water.

To achieve the above objects of the invention, there is provided a faucet for a waterbowl including a control knob, a lifting seat, a valve cover, a valve body and a spindle assembly which controls the water flow on-off. The spindle assembly is provided within the valve body, with a spindle of the spindle assembly extending through the upper end of the valve body and hinged to the lifting base. The valve cover is mounted firmly the top of the valve body. Between the control knob and the lifting seat is provided a rotatable locator which is connected to the lifting seat and rotatable around the lifting seat. The control knob is attached to the upper part of the rotatable locator by means of a hollow slidable connecting housing. A sliding rod provided in the slidable connecting housing is inserted into a through hole on the rotatable locator, with a return spring provided on the sliding rod.

Since the faucet according to the present invention includes a rotatable locator which is provided between the control knob and the lifting seat and which is connected to the lifting seat and rotatable around the lifting seat, the faucet may not be opened until both pressing and then turning the control knob downwardly are performed, thereby avoiding any mishandling and scalding.

The foregoing and other objects, features and advantages of the present invention will become more apparent from the following detailed description of the present invention when taken in conjunction with the accompanying drawings.

DETAILED DESCRIPTION OF THE PREFERRED EMBODIMENTS

Figure 1:
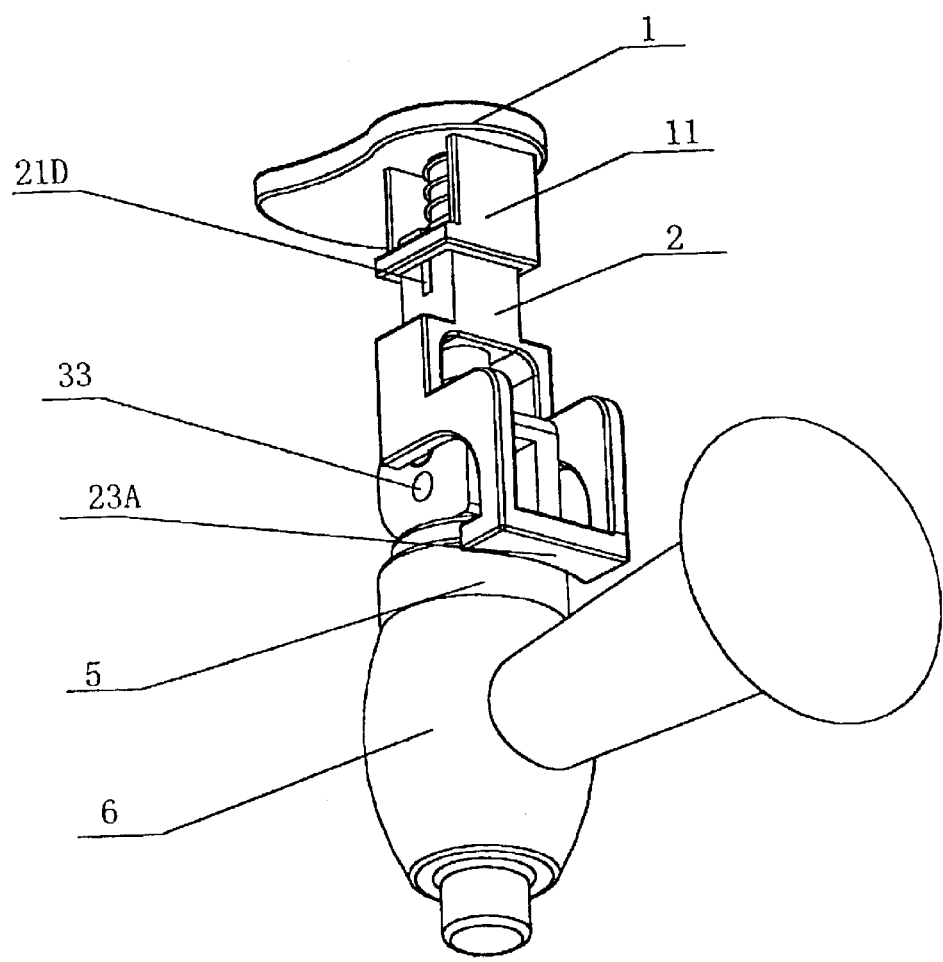
FIG. 1 is a perspective view of the faucet for a waterbowl according to the present invention.
Figure 2:
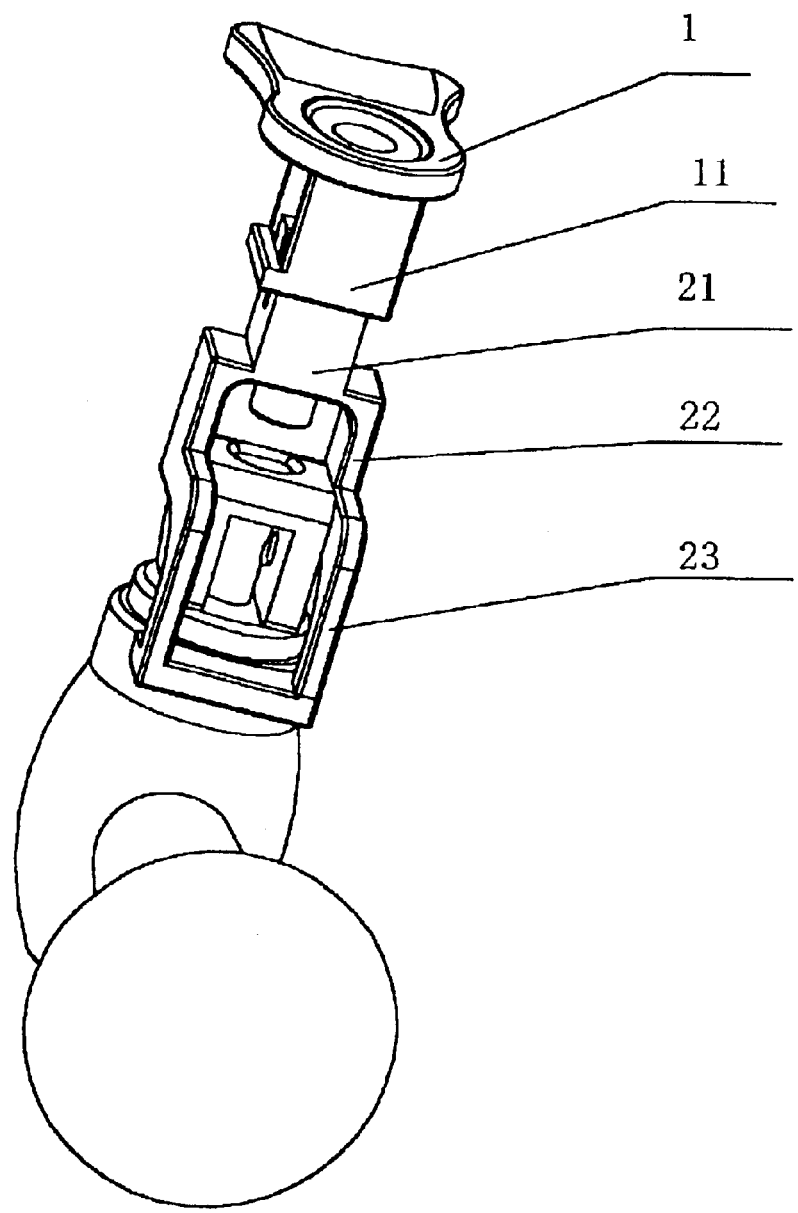
FIG. 2 is another perspective view of the faucet for a waterbowl of FIG. 1.
Figure 3:
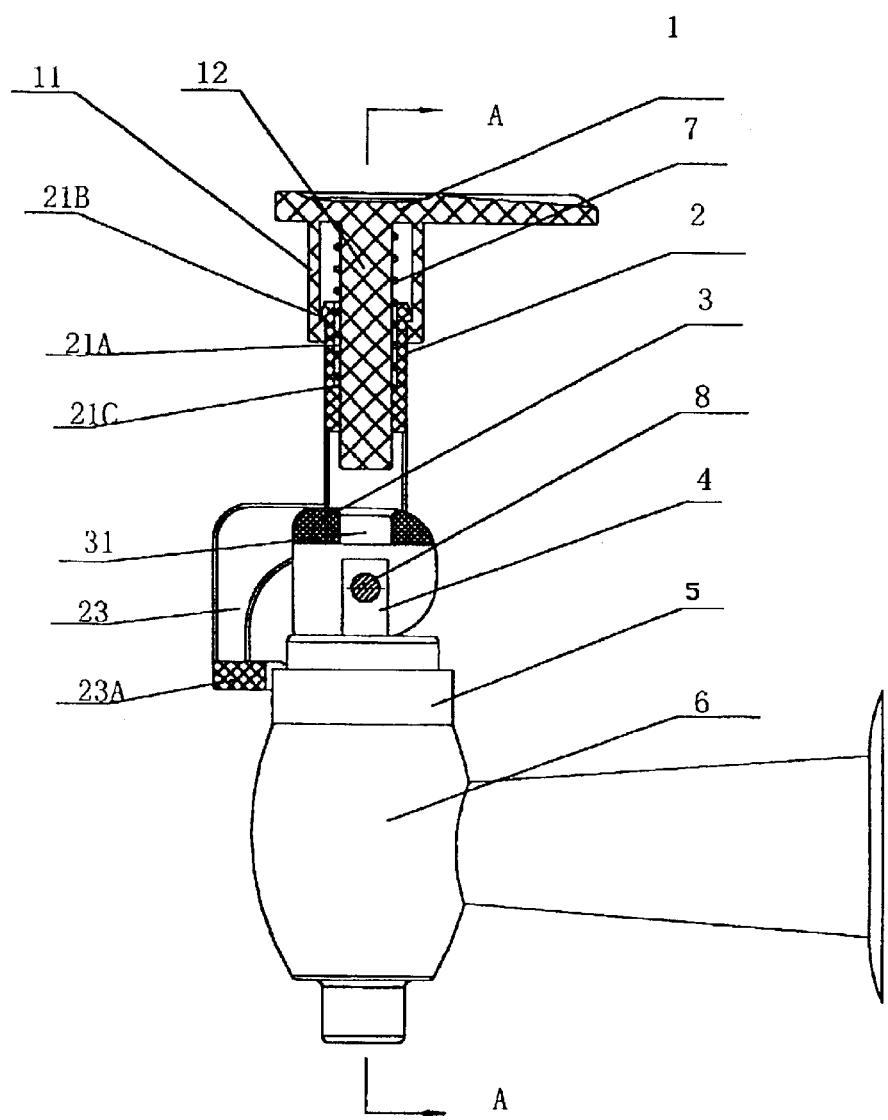
FIG. 3 is a sectional view of the faucet for a waterbowl of FIG. 1.
Figure 4:
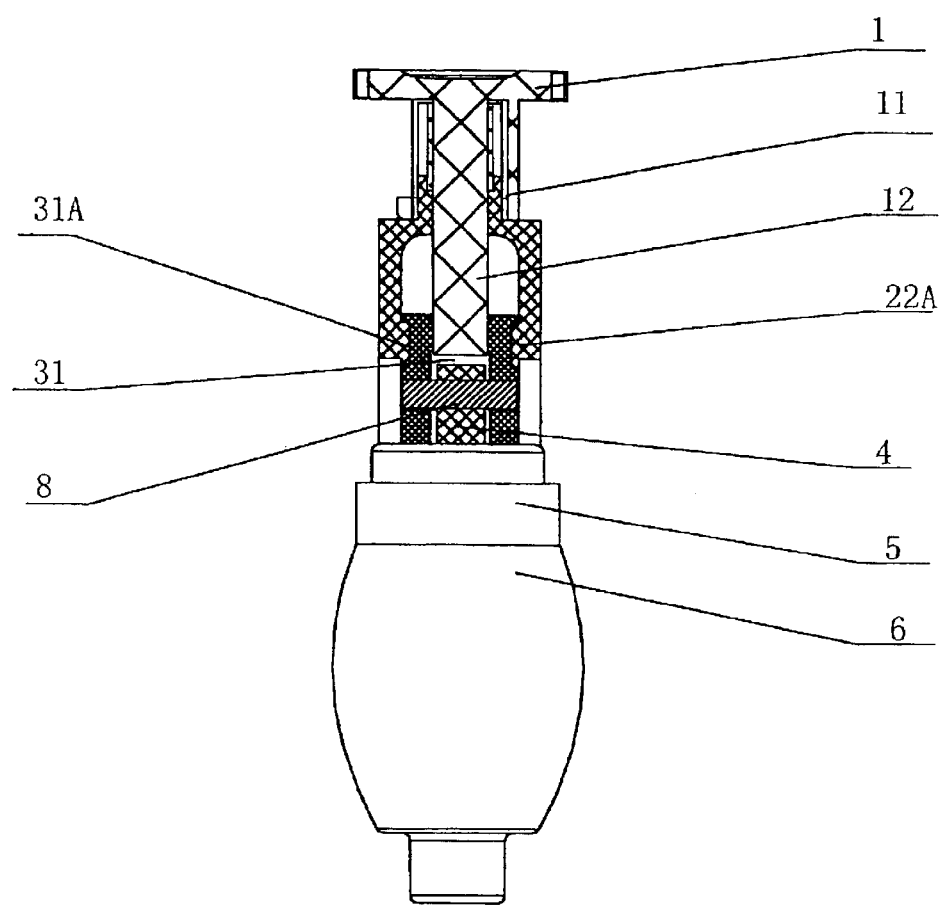
FIG. 4 is a sectional view taken along the line A—A of FIG. 3, with the control knob pressed downwardly.
Figure 5:
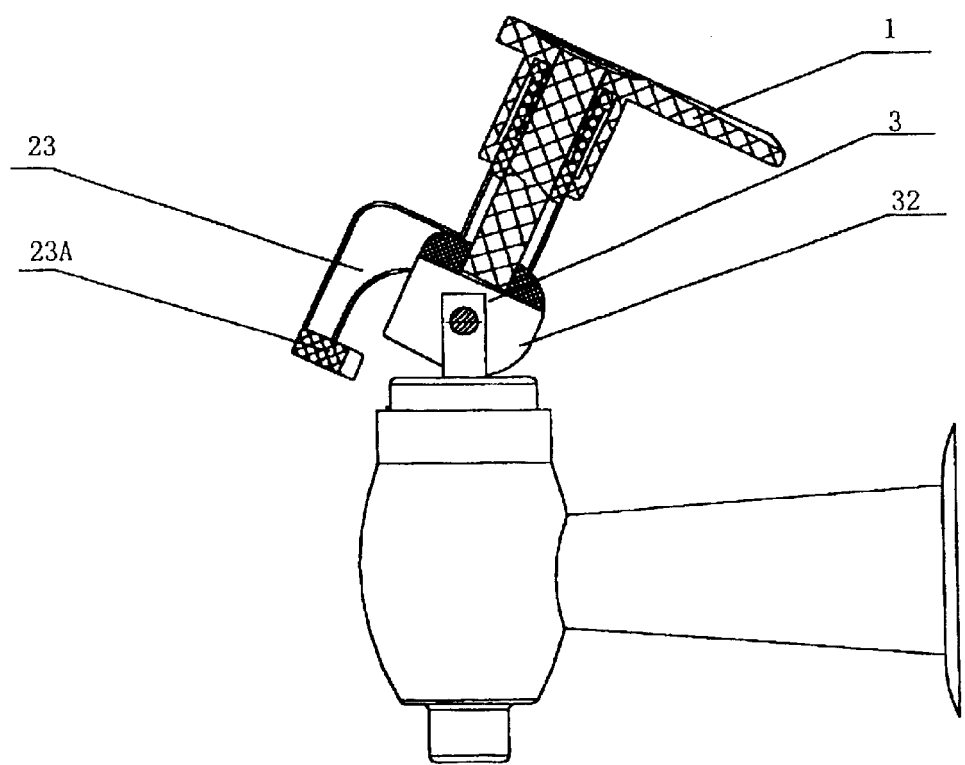
FIG. 5 shows schematically the faucet for a waterbowl according to the present invention in use.

Reference will now be made in detail to the preferred embodiments of the present invention, examples of which are illustrated in the accompanying drawings. The same reference numeral in different drawings represents the same part.

The faucet for a waterbowl according to the present invention includes a control knob 1, a lifting seat 3, a valve cover 5, a valve body 6 and a spindle assembly which controls the water flow on-off. The spindle assembly is provided within the valve body 6, with a spindle 4 of the spindle assembly extending through the upper end of the valve body 6 and hinged to the lifting base 3. The valve cover 5 is mounted firmly the top of the valve body 6. Between the control knob 1 and the lifting seat 3 is provided a rotatable locator 2 which is connected to the lifting seat 3 and rotatable around it. The control knob 1 is attached to the upper part of the rotatable locator 2 by means of a hollow slidable connecting housing 11. A sliding rod 12 provided in the slidable connecting housing 11 is inserted into a through hole 21A on the rotatable locator 2, with a return spring 7 provided on the sliding rod 12. To facilitate the mounting of the return spring 7, within the through hole 21A on the rotatable locator 2 is formed a mounting projection 21C for the return spring 7. The sliding rod 12 and the control knob 1 may be formed integrally or separately and then assembled together. In the embodiment as shown in the drawings, the sliding rod 12 and the control knob 1 are formed integrally to facilitate the processing and the assembling.

To attach the control knob 1 to the rotatable locator 2, on the outside of the top of the upper part 21 of the rotatable locator 2 is formed a flange 21B to prevent the slidable connecting housing 11 from disengaging from the rotatable locator 2. On either side of the flange 21 is provided groove 21D at the upper part 21 to facilitate attaching the rotatable locator 2 to the control knob 1.

The rotatable locator 2 is hinged to the lifting seat 3 by engaging the protruding posts 22A on the inside of the middle part 22 of the rotatable locator 2 with and the recesses 31A on the outside of the lifting seat 3. The protruding posts 22A may also be formed on the outside of the lifting seat 3 and the recesses 31A on the inside of the middle part 22 of the rotatable locator 2. Alternatively, a through hole may be formed on the middle part 22 of the rotatable locator 2 and on the corresponding side walls of the lifting seat 3 respectively so that the rotatable locator 2 is hinged to the lifting seat 3 by means of a pin extending through the through holes.

A locating member 23A is provided on the lower part 23 of the rotatable locator 2 so that the rotatable locator 2 in no-use may abut against the valve cover 5.

The upper part 21, the middle part 22 and the lower part 23 of the rotatable locator 2 may be formed integrally or separately and then assembled together. The locating member 23A may be formed integrally on the lower part 23 of the rotatable locator 2 or formed separately and then attached to the lower part 23.

On the upper end of the lifting seat 3 is provided a mating hole 31, whose size corresponds with that of the sliding rod 12 so that the sliding rod 12 may slide downwardly to insert into the lifting seat 3.

The lifting seat 3 is hinged to the spindle 4 by means of a pin 8 extending through the holes 33 on the side walls of the lifting seat 3 and the spindle 4.

The lower end of the lifting seat 3 forms with an arc-shaped part 32 so that the lifting seat 3 may rotate around the pin 8.

The faucet according to the present invention may be attached to a waterbowl. Since the locating member 23A abuts against the valve cover 5, it is impossible for the user to upturn the control knob 1. If the user turns the control knob 1, it rotates just around the lifting seat 3. Under such two conditions, the faucet can not be opened. However, if the user presses the control knob 1 downwardly, slidable connecting housing 11 slides along the outside of the rotatable locator 2 while the sliding rod 12 provided in the slidable connecting housing 11 slides downwardly along the through hole 21A within the rotatable locator 2 and inserts into the mating hole 31 of the lifting seat 3. Then, the control knob 1 is turned downwardly and the lifting seat 3 rotates accordingly round the pin 8 to move the spindle 4 upwardly so that the faucet is opened and the water flows out of it. The faucet according to the present invention may not be opened until both pressing and then turning the control knob downwardly are performed unidirectionally, thereby avoiding any mishandling and scalding.

As the present invention may be embodied in several forms without departing from the spirit or essential characteristics thereof, it should also be understood that the above-described embodiments are not limited by any of the details of the forgoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A faucet for a waterbowl including a control knob, a lifting seat, a valve cover, a valve body and a spindle assembly which controls the water flow on-off, the spindle assembly being provided within the valve body, with a spindle of the spindle assembly extending through the upper end of the valve body and hinged to the lifting seat, and the valve cover being mounted firmly the top of the valve body, wherein between the control knob and the lifting seat is provided a rotatable locator which is connected to the lifting seat and rotatabale around it; the control knob is attached to the upper part of the rotatable locator by a hollow slidable connecting housing; and a sliding rod provided in the slidable connecting housing is inserted into a through hole on the rotatable locator, with a return spring provided on the sliding rod.

2. A faucet according to claim 1, wherein on the outside of the top of the upper part of the rotatable locator is formed a flange to prevent the slidable connecting housing from disengaging from the rotatable locator; the middle part of the rotatable locator is hinged to the lifting seat; and the lower part of the rotatable locator is provided with a locating member.

3. A faucet according to claim 2, wherein on both sides of the flange are provided grooves at the upper part.

4. A faucet according to claim 1, wherein the rotatable locator is hinged to the lifting seat by engaging the protruding posts on the inside of the middle part with the recesses on the outside of the lifting seat or by engaging the protruding posts on the outside of the lifting seat with the recesses on the inside of the middle part.

5. A faucet according to claim 1, wherein on both the middle part of the rotatable locator and the corresponding side walls of the lifting seat are provided the through holes so that the rotatable locator is hinged to the lifting seat by a pin extending through the through holes.

6. A faucet according to claim 1, wherein within the through hole of the rotatable locator is formed a mounting projection for the return spring.

7. A faucet according to claim 1, wherein the sliding rod and the control knob are formed integrally or separately and then assembled together.

8. A faucet according to claim 1, wherein the upper part, the middle part and the lower part of the rotatable locator are formed integrally or separately and then assembled together; and the locating member is formed integrally on the lower part of the rotatable locator or formed separately and then attached to the lower part.

9. A faucet according to claim 1, wherein on the upper end of the lifting seat is provided a mating hole, whose size corresponds with that of the sliding rod.

10. A faucet according to claim 9, wherein the lower end of the lifting seat forms with an arc-shaped part.

* * * * *